[84.]

Austin G. Brassfield's Improvement in Corn-Markers

No. 118,584.                 Patented Aug. 29, 1871.

Witnesses
John Manson
Edward Williams

Austin G. Brassfield
Inventor
by Edmund Thurston
his atty in fact

AM. PHOTO-LITHOGRAPHIC CO. N.Y. (OSBORNE'S PROCESS.)

UNITED STATES PATENT OFFICE.

AUSTIN G. BRASSFIELD, OF HENRY, ILLINOIS.

IMPROVEMENT IN CORN-MARKERS.

Specification forming part of Letters Patent No. 118,584, dated August 29, 1871.

*To all whom it may concern:*

Be it known that I, AUSTIN G. BRASSFIELD, of Henry, in the county of Marshall and in the State of Illinois, have invented an Improvement in Corn-Marker; and do hereby declare that the following is a full, clear, and exact description thereof, reference being had to the annexed drawing making a part of this specification, in which like letters of reference refer to like parts, and in which—

Figure 1:
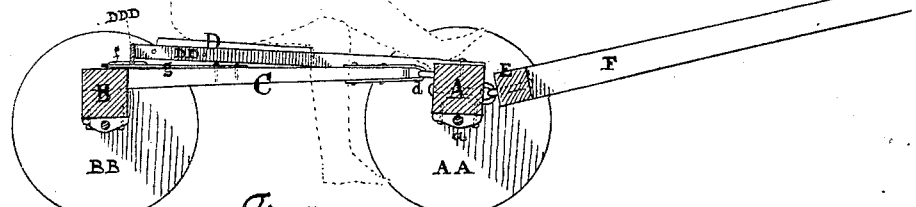
Figure 2:
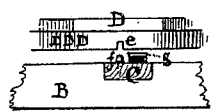
Figure 3:
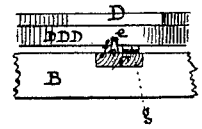
Figure 4:
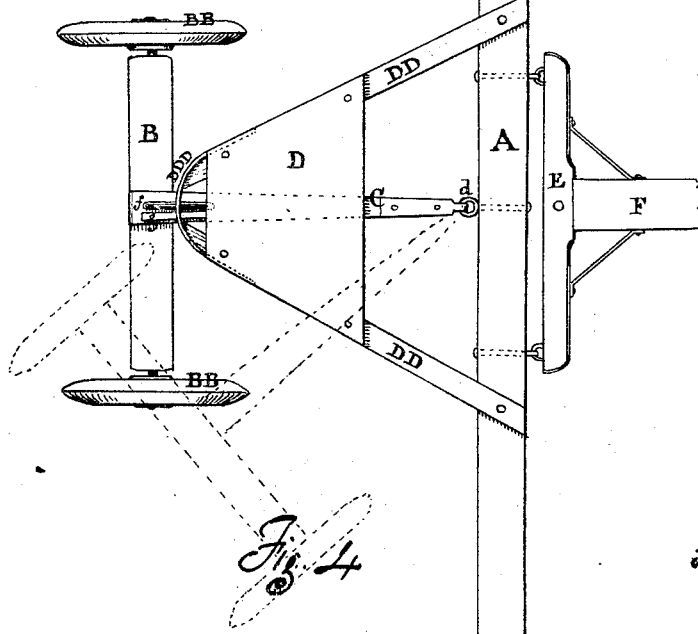
Figure 5:
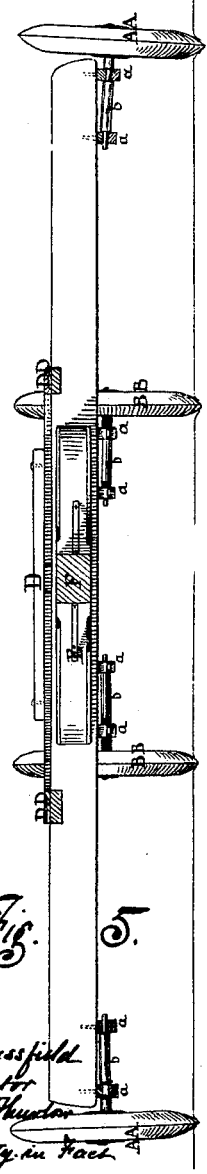

Figure 1 represents a sectional side elevation; Fig. 2, an elevation of the rear of seat, platform, catch, and axle; Fig. 3, the same engaged together; Fig. 4, a plan of the marker, the dotted lines indicating lateral motion of the reach; Fig. 5, front elevation of the same.

This invention consists in pivoting the reach of the rear axle or beam of a corn-marker to the front axle, to obtain lateral motion, in combination with a seat or platform attached to the front axle and provided with a notch or recess on its front end, and arranged to operate in connection with a spring and rib attached to the rear axle or end of the reach, for the purpose as will be hereinafter more fully explained.

A is the longer axle, made of sufficient length to mark the first and fourth rows—the shorter axle and markers making the intermediate lines for the rows—supported on the marking-wheels A A A A at either end. These wheels are mounted under the axle on the short spindles $b\ b$, running in the boxes or bearings $a\ a\ a\ a$ bolted to the axle. The spindles have each a neck, the shoulders of which abut against either side of a bearing or box, $a$. B is the rear stationary axle, mounted in the same manner on the wheels B B B B. C, a short reach pivoted at $d$ to the middle of the front axle and bolted to the rear axle B, at which place is fastened a rib or catch, $f$, and parallel with it a spring, $g$, both on the reach. The free end of the spring supports the rear of the seat-platform when the driver's weight is removed, allowing the seat-platform to be free and the reach to move laterally; but when the driver takes his place on the seat the notch $e$ under said seat engages with the rib $f$, causing the axles of the marker to maintain parallelism. D, the seat, supported on the triangular platform, composed of the bars D D D D, attached by their opening angles to the front axle A and converging at the rear axle B, where they are united by a hoop or plate of iron, D D D, or similar device, having a notch or recess, $e$, on its under edge, before mentioned. E, the cross-bar, in which the heel of the tongue F is fixed, hinged to the front axle.

The operation of this marker is as follows: The wheels A A A A B B B B mark four rows, the driver sitting on the seat D and controlling the team, keeping at the same time the notch $e$ under the platform engaged with the rib $f$ on the reach C by his weight, thus preserving the parallelism of the marker-axles. In turning for a new series of marks he dismounts, and the spring $g$ now frees the notch $e$ from the rib $f$ and the reach is free to turn with its axle and marker-wheels in any direction which may be taken to commence a new set of marks. The spindles $b\ b\ b\ b$ conduce to the facility of working the machine, as they are light and small and produce little friction.

What I claim as my invention is—

The axle B and laterally-moving reach C, with its rib $f$ and spring $g$, in combination with the axle A, and platform D provided with notch or recess $e$, substantially as and for the purpose set forth.

In testimony that I claim the foregoing corn-marker I have hereunto set my hand this 29th day of May, 1871.

AUSTIN G. BRASSFIELD.

Witnesses:
WILLIAM L. MOSS, Jr.,
JOHN MANSONT.